United States Patent Office 3,179,633
Patented Apr. 20, 1965

3,179,633
AROMATIC POLYIMIDES FROM META-PHENYLENE DIAMINE AND PARA-PHENYLENE DIAMINE
Andrew Laszlo Endrey, Parma, Ohio, assignor to E. I. du Pont de Nemours and Company, Wilmington, Del., a corporation of Delaware
No Drawing. Filed Jan. 26, 1962, Ser. No. 169,119
17 Claims. (Cl. 260—78)

This invention relates to novel polymeric materials and has as its primary object a novel method for the preparation of polyamides of meta-phenylenediamine and para-phenylenediamine. Other objects will appear hereinafter.

This application is a continuation-in-part of my copending application Serial No. 803,349, filed April 1, 1959, now abandoned.

The resulting polyimides are characterized by a recurring unit having the following structural formula:

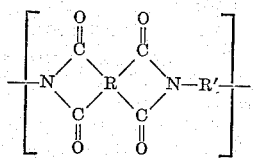

wherein R is a tetravalent radical containing at least one ring of six carbon atoms, said ring characterized by benzenoid unsaturation, the four carbonyl groups being attached directly to separate carbon atoms in a 6 membered benzenoid ring of the R radical and each pair of carbonyl groups being attached to adjacent carbon atoms in a ring of the R radical; and wherein R' is a divalent radical selected from the group consisting of

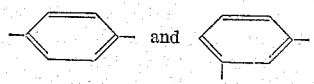

These polyimides, prepared by the process of the present invention, display outstanding physical and chemical properties which make them very useful as shaped structures such as self-supporting films, fibers, filaments and the like. The structures are characterized by high tensile properties, desirable electric properties and surprising stability to heat and water.

The polyimides are prepared by reacting at least one organic diamine selected from the group consisting of meta-phenylenediamine and para-phenylenediamine with at least one tetracarboxylic acid dianhydride having the structural formula:

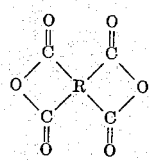

wherein R is a tetravalent radical containing at least one ring of six carbon atoms, said ring characterized by benzenoid unsaturation, the four carbonyl groups being attached directly to separate carbon atoms in a six-member benzenoid ring of the R radical and each pair of carbonyl groups being attached to adjacent carbon atoms in a six-member benzenoid ring of the radical, in an organic solvent for at least one of the reactants, the solvent being inert to the reactants, preferably under substantially anhydrous conditions for a time and at a temperature below 175° C. sufficient to provide at least 50% of the corresponding polyamide-acid and then converting the polyamide-acid to the polyamide, the polyimide having an inherent viscosity of at least 0.1, preferably 0.3–5, the inherent viscosity being measured on a 0.5% solution in concentrated (96%) sulfuric acid. If the polyimide is not soluble in the acid to the extent of 0.5%, then its inherent viscosity is considered to be greater than 0.1. It is also preferred to form a shaped structure of the polyamide-acid composition prior to converting the polyamide-acid to the polyimide. The conversion of the polyamide-acid to the polyimide may be accomplished by a heat treatment or any of the chemical treatments or combinations of treatments as described hereinafter.

It should be understood that one purpose of the process is to provide a composition containing enough polyamide-acid so that it can be shaped into useful objects prior to conversion of polyamide-acid to polyimide. For this purpose, it has been found that a composition containing a polymeric component made up of at least 50% of the polyamide-acid will suffice for all combinations of diamine/dianhydride reaction products. However, for polyamide-acids prepared from some combinations of the two diamines and dianhydrides, the polymeric components of shapeable compositions may contain less than the preferred minimum of 50%.

Furthermore, in determining a specific time and a specific temperature for forming the polyamide-acid of one of the specified diamines and a specified dianhydride, several factors must be considered. The maximum permissible temperature will depend on which of the two diamines is used, the dianhydride used, the particular solvent, the percentage of polyamide-acid desired in the final composition and the minimum period of time that one desires for the reaction. For most combinations of meta-phenylenediamine or para-phenylenediamine and the dianhydrides falling within the definitions given above, it is possible to form compositions of 100% polyamide-acid by conducting the reaction below 100° C. However, temperatures up to 175° C. may be tolerated to provide shapable compositions. The particular temperature below 175° C. that must not be exceeded for any particular combination of diamine, dianhydride, solvent and reaction time to provide a reaction product composed of sufficient polyamide-acid to be shapable will vary but can be determined by a simple test by any person of ordinary skill in the art. However, to obtain the maximum inherent viscosity, i.e., maximum degree of polymerization, for any particular combination of diamine, dianhydride, solvent, etc., and thus produce shaped articles such as films and filaments of optimum toughness, it has been found that the temperature throughout the reaction should be maintained below 60° C., preferably below 50.° C.

The details of the preferred process involve premixing equimolar amounts of the diamine and the dianhydride as dry solids and then adding the mixture, in small proportions and with agitation, to the organic solvent. Premixing the ingredients and then adding them in small proportions to the solvent provides relatively simple means for controlling the temperature and the rate of the process. Since the reaction is exothermic and tends to accelerate very rapidly, it is important to regulate the additions to maintain the reaction temperature at the desired level. However, the order of addition may be varied. After premixing the diamine and the dianhydride, the solvent may be added to the mixture with agitation. It is also possible to dissolve the diamine in the solvent while agitating, preheat the solution and then add the dianhydride at a sufficiently slow rate to control the reaction temperature. Ordinarily, in this latter process the last portion of the dianhydride is added with part of the organic solvent. Another possible method involves adding the reactants to the solvent in small proportions, not as a premixture, but alternately; first diamine, then dianhydride, then diamine, etc. In any event, it is advisable to agitate the solution polymerization system after the additions are completed until maximum viscosity denoting maximum polymerization is obtained. Still another process involves dissolving the diamine in one portion of a solvent and the dianhydride in another portion of the same or another solvent and then mixing the two solutions.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. However, the scope of the process encompasses the use of up to 5% excess of either the diamine or the dianhydride. More than 5% excess of either reactant results in an undesirably low molecular weight polyamide-acid. For some purposes, it is desirable to use 1–3% excess of either reactant, preferably the dianhydride. Besides using an excess of one reactant to limit the molecular weight of the polyamide-acid, a chain terminating agent such as phthalic anhydride may be used to "cap" the ends of the polymer chains.

In the preparation of the polyamide-acid intermediate, it is essential that the molecular weight be such that the inherent viscosity of the amide-acid polymer is at least 0.1, preferably 0.3–5.0. The inherent viscosity is measured at 30° C. at a concentration of 0.5% by weight of the polymer in a suitable solvent e.g., N,N-dimethylacetamide. To calculate inherent viscosity, the viscosity of the polymer solution is measured relative to that of the solvent alone.

Inherent viscosity =
$$\frac{\text{natural logarithm } \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the polymeric solution. That is, the solution should contain 0.05–40% of the polymeric component. The viscous solution of the polymeric composition containing at least 50% polyamide-acid in the polymeric component dissolved in the solvent may be used as such for forming shaped structures.

The shaped articles composed of at least 50% polyamide-acid are then converted to the respective polyimide shaped articles. It should be understood that the conversion processes to be described also apply to compositions containing salt derivatives of polyamide-acids, e.g., the triethyl ammonium salt of the polyamide-acids, instead of the polyamide-acids themselves.

It should also be understood that instead of shaping the polyamide-acid composition into the usual articles, the polyamide-acid composition in the solvent may be used as a liquid coating composition. Such coating compositions may be pigmented with such compounds as titanium dioxide in amounts of 5–200% by weight. These coating compositions may be applied to a variety of substrates, for example, metals, e.g., copper, brass, aluminum, steel, etc., the metals in the form of sheets, wires, screening, etc.; glass in the form of sheets, fibers, foams, fabrics, etc.; polymeric materials, e.g. cellulosic materials such as cellophane, wood, paper etc., polyolefins such as polyethylene, polypropylene, polystyrene, etc., polyesters such as polyethylene terephthalate, etc., perfluorocarbon polymers such as polytetrafluoroethylene, copolymers of tetrafluoroethylene with hexafluoropropylene, etc., polyurethanes, all polymeric materials in the form of sheets, fibers, foams, woven and non-woven fabrics, screening, etc.; leather sheets; etc. The polyamide-acid coatings are then converted to polyimide coatings by one or more of the processes to be described.

One process comprises converting the polyamide-acids having recurring units of the following structural formula:

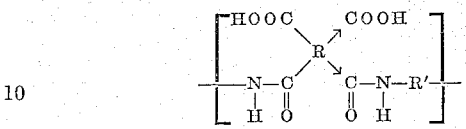

wherein → denotes isomerism, to polyimides by heating above 50° C. Heating serves to convert pairs of amide and carboxylic acid groups to imide groups. Heating may be conducted for a period of a few seconds to several hours. It has been found that after the polyamide-acid has been converted to the polyimide in accordance with the above described heat conversion, if the polyimide is further heated to a temperature of 300°–500° C. for a short interval (15 seconds to 2 minutes), improvements in the thermal and hydrolytic stabilities of the polyimide are obtained as well as an increase in inherent viscosity.

A second process for converting the polyamide-acid composition to the polyimide thereof is a chemical treatment and involves treating the polyamide-acid composition with a dehydrating agent alone or in combination with a tertiary amine, e.g., acetic anhydride or an acetic anhydride-pyridine mixture. The polyamide-acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. Other possible dehydrating agents for use include propionic anhydride, butyric anhydride, valeric anhydride and mixed lower fatty-acid anhydrides. Other tertiary amine catalysts include triethylamine, isoquinoline, α, β or gamma-picoline, 2,5-lutidine, etc.

A third process for conversion involves treatment with a carbodiimide, e.g., dicyclohexylcarbodiimide. The carbodiimide also serves to dehydrate the polyamide-acid and to act as an effective cyclyzing agent.

As a fourth process of conversion, a combination treatment may be used. The polyamide-acid may be partially converted to the polyimide in a chemical conversion treatment and then cyclization to the polyimide may be completed by subsequent heat treatment. The conversion of the polyamide-acid to the polyimide in the first step should not exceed 50% if it is desired to shape the composition into suitable forms. After shaping, the completion of the cyclization of the polyimide/polyamide-acid may be accomplished.

The presence of polyimides is evidenced by their insolubility in cold NaOH solution as opposed to the rapid solubility of the polyamide-acid. Their presence is also apparent if the polyamide-acids are scanned with infrared during conversion to the polyimide. The spectra initially show a predominating absorption band at ca. 3.1 microns due to the NH bond. This band gradualy disappears and as the reaction progresses, the polyimide absorption bands appear, a doublet at ca. 5.64 and 5.89 microns and a peak at 13.85 microns. When conversion is completed, the characteristic polyimide band predominates. In some cases, one can also detect minor amounts of isoimide linkages, i.e.,

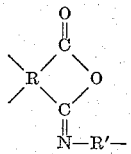

The starting materials for forming the products of the present invention are specific organic diamines, meta-phenylenediamine and para-phenylenediamine and specific tetracarboxylic acid dianhydrides. The tetracarboxylic acid dianhydrides are characterized by the following formula:

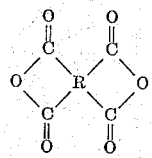

wherein R is a tetravalent radical containing at least 6 carbon atoms characterized by benzenoid unsaturation, wherein the 4 carbonyl groups of the dianhydride are each attached to separate carbon atoms and wherein each pair of carbonyl groups is directly attached to adjacent carbon atoms in the R group to provide a 5-membered ring as follows:

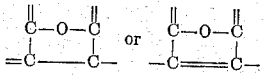

Illustrations of dianhydrides suitable for use in the present invention include: pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride, bis(3,4-dicarboxyphenyl) ether dianhydride, 2,2-bis(2,3-dicarboxyphenyl) propane dianhydride, 1,1-bis(2,3-dicarboxyphenyl) ethane dianhydride, 1,1-bis(3,4-dicarboxyphenyl) ethane dianhydride, bis(2,3-dicarboxyphenyl) methane dianhydride, bis(3,4-dicarboxyphenyl) methane dianhydride, etc.

The solvents useful in the solution polymerization process for synthesizing the intermediate polyamide-acid compositions in the preferred process of preparing the polyimides are the organic solvents whose functional groups do not react with either of the reactants (the diamines or the dianhydrides) to a greater extent than the reactants do with each other. Besides being inert to the system and, preferably, being a solvent for the product, the organic solvent must be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process of this invention. The preferred solvents are the lower molecular weight members of this class, particularly N,N-dimethylformamide and N,N-dimethylacetamide. They may easily be removed from the polyamide-acid and/or polyamide-acid shaped articles by evaporation, displacement or difusion. Other typical compounds of this useful class of solvents are: N,N-diethylformamide, N,N-diethylacetamide, N,N-dimethylmethoxy acetamide, N-methyl caprolactam, etc. Other solvents which may be used in the present invention are: dimethylsulfoxide, N-methyl-2-pyrrolidone, tetramethyl urea, pyridine, dimethylsulfone, hexamethylphosphoramide, tetramethylene sulfone, formamide, N-methylformamide, butyrolactone. The solvents can be used alone, in combinations of solvents, or in combination with poor solvents such as benzene, benzonitrile, dioxane, xylene, toluene and cyclohexane.

The invention will be more clearly understood by referring to the examples which follow. These examples, which illustrate specific embodiments of the present invention, should not be construed to limit the invention in any way.

For convenience, abbreviations will be used wherever possible. Thus, MPD represents meta-phenylenediamine; PPD, para-phenylenediamine; PMDA, pyromellitic dianhydride; PPDA, 2,2-bis(3,4-dicarboxyphenyl) propane dianhydride; DMF, N,N-dimethylformamide; DMA, N,N-dimethylacetamide; P, pyridine; B, butyrolactone; and AA, acetic anhydride.

The examples are summarized in Table I. The details of the examples, where some of the compositions are shaped into useful structures such as films and filaments, follow the table.

The preparations of some of the important ingredients used in the examples are given below:

The meta-phenylenediamine used was colorless and had a melting point of 62–63° C. It was prepared by first bubbling air through a melt of the commercially available product followed by fractional distillation.

The pyromellitic dianhydride used was obtained as white crystals by sublimation of the commercial product through silica gel at 220–240° C. and 0.25–1 mm. mercury pressure.

N,N-dimethylformamide and N,N-dimethylacetamide were prepared by fractional distillation from phosphorus pentoxide; the fraction distilling at 47.5° C. and 17 mm. pressure being N,N-dimethylformamide and the fraction distilling at 73° C. and 30 mm. pressure being N,N-dimethylacetamide.

TABLE I

Summary of examples

| Example | Gms. Reactants | | Mls. Solvent | Conversion |
|---|---|---|---|---|
| | Diamine | Dianhydride | | |
| 1 | 12.4 MPD | 25.0 PMDA | 145 DMF | Heat. |
| 2 | {6.2 MPD, 6.2 PPD} | 25.0 PMDA | 200 DMF/P(1/1) | Heat. |
| 3 | 12.4 MPD | 25.0 PMDA | 175 DMF/P(4/3) | (1) |
| 4 | 6.2 PPD | 12.5 PMDA | 120 DMA | P/AA. |
| 5 | 12.4 MPD | 25.0 PMDA | 145 DMF | P/AA. |
| 6 | 12.4 MPD | 10.0 PMDA | 200 DMF/B(4/1) | P/AA. |

[1] In Example 3, stoichiometric amounts of acetic anhydride/pyridine were added to the polyamide-acid solutions to convert 30 mole percent of the polyamide-acid groups to the corresponding polyimide prior to final conversion by heating.

EXAMPLE 1

Meta-phenylenediamine, 12.4 g. (0.115 mole) was dissolved in 75 ml. of dimethylformamide. 25.00 g. (0.115 mole) of pyromellitic dianhydride was added portionwise with agitation while the solution was externally cooled with circulating water at approximately 15° C. The last portion of dianhydride was added in 10 ml. of dimethylformamide. A viscous dope formed and was further diluted with 60 ml. of dimethylformamide and then filtered through a pressure filter.

Films were cast on glass plates and dried in vacuo at 80° C. for 30 minutes. After removal from the plates, the films were fixed over a steel plate with magnets holding the edges down and further dried for 30 minutes at 100–110° C. in vacuo. The plate with the film was then heated to 300° C. in a hot vacuum oven for 15 minutes to convert the polyamide-acid to the polyimide. The polyimide films displayed the following properties:

Inherent viscosity—0.33 (0.5% solution in sulfuric acid)
Density—1.43
Tensile modulus—400,000 p.s.i.
Elongation—10%
Tensile strength—15,000 p.s.i.
Retention of degree of toughness—greater than 3
Hydrolytic stability—100 hours in boiling water, 18 hours in 180° C. steam
Thermal stability—greater than 30 days at 300° C. in air
Zero strength temperature—800° C.
Electrical volume resistivity (ohm.-cm.), at 23° C.—greater than $10^5$ The tests are performed as follows:

Tensile strength, elongation and tensile modulus: These measurements are determined at 23° C. and 50% relative humidity. They are determined by elongating the film sample [1] at a rate of 100% per minute until the sample breaks. The force applied at the break in pounds/square inch (p.s.i.) is the tensile strength. The elongation is the percent increase in the length of the sample at breakage. Initial tensile modulus in p.s.i. is directly related to film stiffness. It is obtained from the slope of the stress-strain curve at the elongation of 1%; both tensile strength and initial tensile modulus are based upon the initial cross-sectional area of the sample.

Zero strength temperature: The zero strength temperature is that temperature at which a film supports a load of 20 lbs./square inch of film cross-sectional area for no more nor less than 5±0.5 seconds. The test is carried out by placing the sample in contact with a heated bar, the proper load being previously applied, and determining the length of time required for failure. This is carried out at various temperatures until the zero strength temperature is determined.

Degree of toughness is determined by subjecting a film 1 to 7 mils thick to a series of creasing actions by folding the film through 180° and creasing, followed by folding through 360° and creasing, to complete one cycle. The number of creasing cycles which the film withstands before breaking at the crease line is referred to herein as the "degree of toughness." If a film cannot be creased without breaking, it has a "degree of toughness" of 0, and if the film breaks on the second cycle, its "degree of toughness" is 1, and so on. The "degree of toughness" for films of the present invention must be at least 3.

Retention of degree of toughness: This test is used for determining the effect of heat on the retention of toughness. It involves heating the polymer at 360° C. for 20 minutes under nitrogen, and determining loss of toughness caused by such heating. The retention of the "degree of toughness" must also be at least 3.

Hydrolytic and thermal stabilities are evident from the foregoing description of the results.

Electrical volume resistivity is determined in accordance with a known test as described in U.S. Patent No. 2,787,603.

EXAMPLES 2–3

These examples were performed substantially as described for Example 1 using the ingredients shown in Table I. The cast films were all converted to polyimide films by heating first at 100–110° C., then at 300° C. as described in Example 1. In Example 3, a two-step conversion process was used as described in Table I.

The properties of the resulting polyimide films are given in Table II.

TABLE II

| Example | Tensile Modulus | Elongation | Tensile Strength | Retention of Degree of Toughness | Inherent Viscosity |
|---|---|---|---|---|---|
| 2 | 500,000 | 5 | 14,200 | [1] 3 | [1] 0.3 |
| 3 | 440,000 | 5 | 12,000 | [1] 3 | 0.39 |

[1] Greater than.

EXAMPLES 4–6

The polyamide-acid solutions were prepared substantially as described for Example 1 using the ingredients shown in Table I. The solutions were cast into films on glass plates. After drying for 30 minutes, the polyamide-acid films were stripped from the glass plates and converted by chemical means to polyimide films.

In Example 4, the film was steeped in a 3/2 pyridine/acetic anhydride mixture for 24 hours to effect conversion to the polyimide. The film was then immersed in dioxane for two hours, dried at 130° C. for one hour and then heated at 380° C. for one minute.

In Examples 5–6, the films were steeped in a 15/1/1 cyclohexane/pyridine/acetic anhydride mixture for 48 hours, then extracted in dioxane for one hour and then dried at 120° C. for one hour.

The properties of the resulting films are given in Table III.

TABLE III

| Example | Tensile Modulus | Elongation | Tensile Strength | Retention of Degree of Toughness |
|---|---|---|---|---|
| 4 | 520,000 | 5.5 | 14,000 | [1] 3 |
| 5 | 320,000 | 12 | 9,400 | [1] 3 |
| 6 | 360,000 | 11 | 10,400 | [1] 3 |

[1] Greater than.

The polyimides of this invention find many applications in a wide variety of physical shapes and forms. Among the most significant of these forms are films and fibers. The useful combination of the desirable physical and chemical characteristics of this polymer is unique. Films and fibers of this polymer not only possess excellent physical properties at room temperature, but retain their strength and excellent response to work-loading at elevated temperatures for prolonged periods of time. Behavior of this type offers commercial utility in a wide range of end uses. The polyimide polymers display excellent resistance to corrosive atmospheres, outstanding resistance to degradation by high energy particles and gamma ray radiation. The polymer resists melting upon exposure at 500° C. for extended periods while retaining hitherto unrealized high proportions of room temperature physical properties. Because of the unusual and surprising solubility of the polymer precursor in the process of preparation, this polymer precursor may be processed into shaped articles such as films and fibers by conventional techniques and then converted in situ to the polyimide polymer.

Films formed from the polymer of this invention may be used wherever films have heretofore been used. They serve advantageously in an extensive variety of wrapping, packaging and bundling applications. Additionally, the polymer and film-forming polymer may be used in automobile and aviation interior head lining materials, decorative trim, high temperature electrical insulation such as for slot liners, use in dry transformers, capacitors, cable wrappings, etc., packaging of items to be exposed to high temperature or high energy radiation while within the package, corrosion-resistant pipe, duct work, containers and container linings, and laminating structures where the films are bonded to the sheet metal or foils, and a variety of other similar and related uses. In fiber form, the polymer offers possibilities for high temperature electrical insulation, protective clothing and curtains, filtration media, packing and gusseting materials, brake linings and clutch facings.

Having fully disclosed the invention, what is claimed is:

1. A polyimide having the recurring unit:

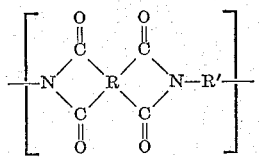

wherein R is a tetravalent radical containing at least one ring of six carbon atoms, said ring characterized by benzenoid unsaturation, the four carbonyl groups being attached directly to separate carbon atoms in a ring of the R radical and each pair of carbonyl groups being attached to adjacent carbon atoms in a ring of the R radical; and

---

[1] Samples were cut with a Thwing-Albert Cutter which cut samples ¼" wide.

wherein R' is a divalent radical selected from the group consisting of

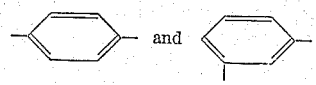

having a degree of toughness when measured on a film of said polyimide of at least 3 and a retention of degree of toughness upon heating said film to 360° C. for 20 minutes under nitrogen of at least 3.

2. A polyimide of at least one aromatic tetracarboxylic acid dianhydride wherein all four carbonyl groups of said dianhydride are directly attached to an aromatic ring of said dianhydride and at least one diamine selected from the group consisting of meta-phenylenediamine and para-phenylenediamine having a degree of toughness when measured on a film of said polyimide of at least 3 and a retention of degree of toughness upon heating said film to 360° C. for 20 minutes under nitrogen of at least 3.

3. The polyimide of claim 2 in the form of a filament.

4. A film consisting essentially of at least one polyimide of at least one aromatic tetracarboxylic acid dianhydride selected from the group consisting of pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride and bis(3,4-dicarboxyphenyl) ether dianhydride and at least one diamine selected from the group consisting of metaphenylene diamine and para-phenylene diamine, said film having a degree of toughness of at least 3 and a retention of degree of toughness upon heating to 360° C. for 20 minutes under nitrogen of at least 3.

5. A film consisting essentially of at least one polyimide of pyromellitic dianhydride and at least one diamine selected from the group consisting of meta-phenylene diamine and para-phenylene diamine, said film having a degree of toughness of at least 3 and a retention of degree of toughness upon heating to 360° C. for 20 minutes under nitrogen of at least 3.

6. A film consisting essentially of at least one polyimide of at least one aromatic tetracarboxylic acid dianhydride wherein all four carbonyl groups of said dianhydride are directly attached to an aromatic ring of said dianhydride and at least one diamine selected from the group consisting of meta-phenylenediamine and para-phenylenediamine, said film having a degree of toughness of at least 3 and a retention of degree of toughness upon heating to 360° C. for 20 minutes under nitrogen of at least 3.

7. A process for preparing polyimides which comprises reacting at least one diamine from the group consisting of meta-phenylene diamine and para-phenylene diamine with at least one aromatic tetracarboxylic acid dianhydride wherein all four carbonyl groups of said dianhydride are directly attached to an aromatic ring of said dianhydride in an organic solvent for at least one of the group consisting of said diamine and said dianhydride, said solvent being inert to the system, while maintaining the temperature throughout the reaction sufficiently below 175° C. to form a polyamide intermediate soluble in said solvent; and subsequently heating said polyamide intermediate at a temperature above 50° C. for a time sufficient to form an insoluble solid polyimide.

8. A process as in claim 7 wherein equimolar amounts of the diamine and the tetracarboxylic acid dianhydride are used.

9. A process for preparing polyimides which comprises reacting at least one diamine from the group consisting of meta-phenylene diamine and para-phenylene diamine with at least one aromatic tetracarboxylic acid dianhydride wherein all four carbonyl groups of said dianhydride are directly attached to an aromatic ring of said dianhydride in an organic solvent for at least one of the group consisting of said diamine and said dianhydride, said solvent being inert to the system, while maintaining the temperature throughout the reaction sufficiently below 175° C. to form a polyamide intermediate soluble in said solvent; and subsequently heating said polyamide intermediate at a temperature above 50° C. for a time sufficient to form an insoluble solid polyimide; and heating said polyimide to a temperature of 300° C.–500° C. for at least 15 seconds.

10. A process for preparing polyimides which comprises reacting at least one diamine from the group consisting of meta-phenylene diamine and para-phenylene diamine with at least one aromatic tetracarboxylic acid dianhydride wherein all four carbonyl groups of said dianhydride are directly attached to an aromatic ring of said dianhydride in an organic solvent for at least one of the group consisting of said diamine and said dianhydride, said solvent being inert to the system, while maintaining the temperature throughout the reaction sufficiently below 175° C. to form a polyamide intermediate soluble in said solvent; shaping said polyamide intermediate into a self-supporting film; and subsequently heating said film at a temperature above 50° C. for a time sufficient to form an insoluble solid polyimide film.

11. A process for preparing polyimides which comprises reacting at least one diamine from the group consisting of meta-phenylene diamine and para-phenylene diamine with at least one aromatic tetracarboxylic acid dianhydride wherein all four carbonyl groups of said dianhydride are directly attached to an aromatic ring of said dianhydride in an organic solvent for at least one of the group consisting of said diamine and said dianhydride, said solvent being inert to the system, while maintaining the temperature throughout the reaction sufficiently below 175° C. to form a polyamide intermediate soluble in said solvent; forming said polyamide intermediate into a shaped structure; and subsequently heating said shaped structure at a temperature above 50° C. for a time sufficient to form an insoluble solid polyimide shaped structure.

12. A process for preparing polyimides which comprises reacting at least one diamine from the group consisting of meta-phenylene diamine and para-phenylene diamine with pyromellitic dianhydride in an organic solvent for at least one of the group consisting of said diamine and said dianhydride, said solvent being inert to the system, while maintaining the temperature throughout the reaction sufficiently below 175° C. to form a polyamide intermediate soluble in said solvent; and subsequently heating said polyamide intermediate at a temperature above 50° C. for a time sufficient to form an insoluble solid polyimide.

13. A process for preparing polyimides which comprises reacting meta-phenylene diamine with at least one aromatic tetracarboxylic acid dianhydride selected from the group consisting of pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride and bis(3,4-dicarboxyphenyl) ether dianhydride in an organic solvent for at least one of the group consisting of said diamine and said dianhydride, said solvent being inert to the system, while maintaining the temperature throughout the reaction sufficiently below 175° C. to form a polyamide intermediate soluble in said solvent; and subsequently heating said polyamide intermediate at a temperature above 50° C. for a time sufficient to form an insoluble solid polyimide.

14. A process for preparing polyimides which comprises reacting para-phenylene diamine with at least one aromatic tetracarboxylic acid dianhydride selected from the group consisting of pyromellitic dianhydride, 2,3,6,7- naphthalene tetracarboxylic dianhydride, 3,3′,4,4′-diphenyl tetracarboxylic dianhydride, 1,2,5,6-naphthalene tetracarboxylic dianhydride, 2,2′,3,3′-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride and bis(3,4-dicarboxyphenyl) ether dianhydride in an organic solvent for at least one of the group consisting of said diamine and said dianhydride, said solvent being inert to the system, while maintaining the temperature throughout the reaction sufficiently below 175° C. to form a polyamide intermediate soluble in said solvent; and subsequently heating said polyamide intermediate at a temperature above 50° C. for a time sufficient to form an insoluble solid polyimide.

15. A process for preparing polyimides which comprises reacting meta-phenylene diamine with at least one aromatic tetracarboxylic acid dianhydride selected from the group consisting of pyromellitic dianhydride, 2,3,6,7-naphthalene tetracarboxylic dianhydride, 3,3′,4,4′-diphenyl tetracarboxylic dianhydride, 1,2,5,6-naphthalene tetracarboxylic dianhydride, 2,2′,3,3′-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride and bis(3,4-dicarboxyphenyl) ether dianhydride in an organic solvent selected from the group consisting of N,N-dimethylformamide; N,N-dimethylacetamide; N,N-diethylformamide; N,N-diethylacetamide; N,N-dimethylmethoxy acetamide; and N-methyl caprolactam while maintaining the temperature throughout the reaction sufficiently below 175° C. to form a polyamide intermediate soluble in said solvent; and subsequently heating said polyamide intermediate at a temperature above 50° C. for a time sufficient to form an insoluble solid polyimide.

16. A process for preparing polyimides which comprises reacting para-phenylene diamine with at least one aromatic tetracarboxylic acid dianhydride selected from the group consisting of pyromellitic dianhydride, 2,3,6,7-naphthalene tetracarboxylic dianhydride, 3,3′,4,4′-diphenyl tetracarboxylic dianhydride, 1,2,5,6-naphthalene tetracarboxylic dianhydride, 2,2′,3,3′-diphenyl tetracarboxylic dianhydride, 2,2-bis(3,4-dicarboxyphenyl) propane dianhydride, bis(3,4-dicarboxyphenyl) sulfone dianhydride, perylene 3,4,9,10-tetracarboxylic acid dianhydride and bis(3,4-dicarboxyphenyl) ether dianhydride in an organic solvent selected from the group consisting of N,N-dimethylformamide; N,N-dimethylacetamide; N,N-diethylformamide; N,N-diethylacetamide; N,N-dimethylmethoxy acetamide; and N-methyl caprolactam while maintaining the temperature throughout the reaction sufficiently below 175° C. to form a polyamide intermediate soluble in said solvent; and subsequently heating said polyamide intermediate at a temperature above 50° C. for a time sufficient to form an insoluble solid polyimide.

17. A process for preparing polyimides which comprises reacting below about 50° C. and while dissolved in an organic solvent at least one diamine from the group consisting of meta-phenylenediamine and para-phenylenediamine with pyromellitic dianhydride to form a polyamide intermediate soluble in said solvent, and subsequently heating said polyamide intermediate to form an insoluble solid polypyromellitimide.

References Cited by the Examiner
UNITED STATES PATENTS

| | | | |
|---|---|---|---|
| 2,071,250 | 2/37 | Carothers | 260—78 |
| 2,710,853 | 1/55 | Edwards et al. | 260—78 |
| 2,712,543 | 7/55 | Gresham et al. | 260—78 |
| 2,731,447 | 1/56 | Gresham et al. | 260—78 |
| 2,880,230 | 3/59 | Edwards | 260—78 |
| 2,900,369 | 8/59 | Edwards | 260—78 |
| 3,037,966 | 6/62 | Chow et al. | 260—78 |

WILLIAM H. SHORT, *Primary Examiner.*

LOUISE P. QUAST, *Examiner.*